U S 0 1 1 9 3 4 8 7 6 B 1

US011934876B1

(12) United States Patent
Briggs

(10) Patent No.: US 11,934,876 B1
(45) Date of Patent: Mar. 19, 2024

(54) COMPILER-DRIVEN STORAGE ALLOCATION OF RUNTIME VALUES

(71) Applicant: Amazon Technologies, Inc., Seattle, WA (US)

(72) Inventor: Preston Pengra Briggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 17/343,435

(22) Filed: Jun. 9, 2021

(51) Int. Cl.
*G06F 9/50* (2006.01)
*G06F 9/30* (2018.01)
*G06F 12/0871* (2016.01)

(52) U.S. Cl.
CPC ........ *G06F 9/5016* (2013.01); *G06F 9/30036* (2013.01); *G06F 9/30101* (2013.01); *G06F 12/0871* (2013.01)

(58) Field of Classification Search
CPC ............... G06F 9/5016; G06F 12/0817; G06F 9/30036; G06F 9/30101
See application file for complete search history.

(56) References Cited

U.S. PATENT DOCUMENTS

| 4,571,678 | A | 2/1986 | Chaitlin | |
|---|---|---|---|---|
| 2004/0003385 | A1 | 1/2004 | Kushlis | |
| 2004/0064811 | A1 | 4/2004 | Alltmejd | |
| 2004/0187102 | A1* | 9/2004 | Garthwaite | G06F 12/0276 717/160 |
| 2007/0074190 | A1 | 3/2007 | Verbitsky | |
| 2007/0150691 | A1* | 6/2007 | Illendula | G06F 12/0246 711/170 |
| 2007/0255676 | A1* | 11/2007 | Brown | H04L 49/3009 |
| 2009/0313612 | A1* | 12/2009 | Vick | G06F 9/4552 717/136 |
| 2013/0198495 | A1* | 8/2013 | Vick | G06F 8/441 712/226 |
| 2013/0246731 | A1* | 9/2013 | Lee | G06F 12/0284 711/170 |
| 2015/0350324 | A1* | 12/2015 | Hu | H04L 67/1097 709/219 |

OTHER PUBLICATIONS

Briggs et al., U.S. Appl. No. 17/341,762, "Color Selection Schemes for Storage Allocation," filed Jun. 8, 2021.
Chaitin, "Register Allocation and Spilling via Graph Coloring," Proceedings of the ACM SIGPLAN '82 Symposium on Compiler Construction, Jun. 1982, pp. 98-105.

* cited by examiner

*Primary Examiner* — Tuan C Dao
(74) *Attorney, Agent, or Firm* — Kilpatrick Townsend & Stockton LLP

(57) ABSTRACT

A compiler-implemented technique for performing a storage allocation is described. Computer code to be converted into machine instructions for execution on an integrated circuit device is received. Based on the computer code, a set of values that are to be stored on the integrated circuit device are determined. An interference graph that includes the set of values and a set of interferences is constructed. A number of possible placements and a number of blocked placements in a memory of the integrated circuit device are computed for each of the set of values. At least a portion of the set of values are assigned to a set of memory locations in the memory based on the numbers of possible placements and blocked placements, resulting in a set of memory location assignments.

20 Claims, 14 Drawing Sheets

```
1 –  A = ...
2 –  B = ...
3 –  C = A + B
4 –  D = A + C
5 –  E = A - B
6 –  F = B + E
7 –  G = D + F
8 –  write G
```

COMPILER-DRIVEN STORAGE ALLOCATION OF RUNTIME VALUES

BACKGROUND

The operations of an integrated circuit device, such as a processor, can be directed by machine-level instructions. These instructions can be generated by a software program referred to as a compiler, which transforms programs written in a human-readable programming language into a machine language that can be understood by the integrated circuit device. The output of the compiler can be referred to as program code, object code, program instructions, or machine instructions, among other examples.

Compilers may utilize various phases that work together in coordination to perform the compilation. Some of these phases may relate to optimizations that aim to minimize the computer program's execution time, power consumption, and memory usage when the instructions are executed on the integrated circuit device. For example, the compiler may include a phase referred to as an instruction scheduler, which attempts to rewrite the code to improve instruction-level parallelism. The instruction scheduler may decompose instructions into multiple stages to improve the pipelining of the instructions. As another example, the compiler may include a phase referred to as a storage allocator, which attempts to assign values that will be generated during execution to specific storage locations on the integrated circuit device.

BRIEF DESCRIPTION OF THE DRAWINGS

Various embodiments in accordance with the present disclosure will be described with reference to the drawings, in which:

FIGS. 5A-5D illustrate an example calculation of a number of possible placements of a value in a two-dimensional memory;

FIG. 6 illustrates an example calculation of a number of blocked placements of a value in a two-dimensional memory;

DETAILED DESCRIPTION

Figures 1A, 1B:
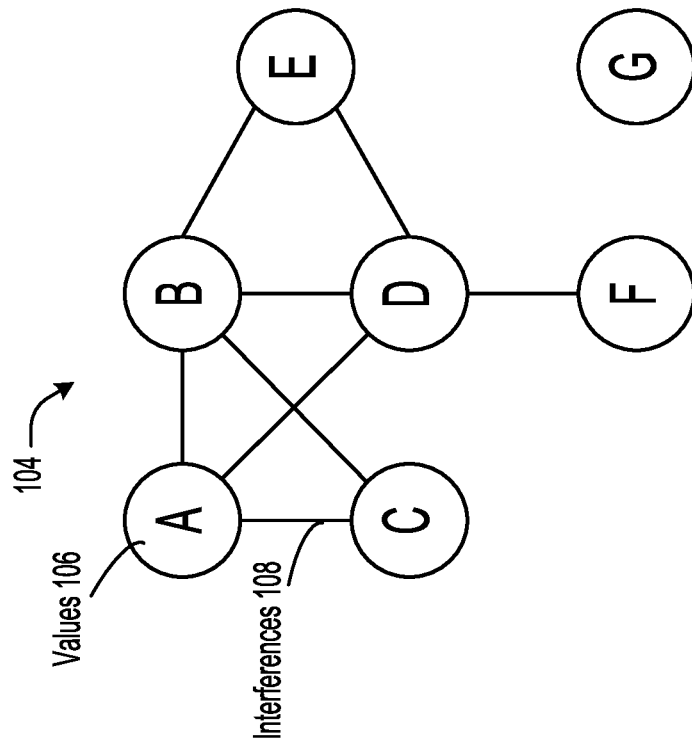
FIGS. 1A and 1B illustrate an example construction of an interference graph based on computer code.

Some optimizations performed by a compiler may be dependent on the specific architecture of the integrated circuit device that is to execute the compiler-generated instructions. These optimizations are generally performed after the hardware-independent optimizations have been performed, and receive as input an intermediate representation of the source code outputted by the hardware-independent optimizations. In various examples, the hardware-specific optimizations may take into consideration the number of registers on the integrated circuit device, the instruction set architecture (ISA) of the integrated circuit device, the supported data types, the cache size, the memory transfer rates, the number of arithmetic logic units (ALUs) or floating-point units (FPUs) on the integrated circuit device, among other possibilities.

In some cases, the integrated circuit device can include multiple execution engines. For example, the integrated circuit device can include parallel execution engines that are capable of performing large, multi-stage computations, such as convolutions. As another example, the integrated circuit device can include execution engines for more specific operations, such as accumulating values or performing floating point math. The data on which the execution engines operate can be retrieved from a memory of the integrated circuit device. Results produced by the execution engines can further be written to the memory.

In some instances, integrated circuit devices having multiple execution engines can be used to execute operations of an artificial neural network. Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, includes multiple layers of processing nodes. Each processing node (or simply "node") in a layer can perform computations on input data generated by processing nodes in a preceding layer to generate output data. For example, a processing node may perform a set of arithmetic operations, such as multiplications and additions to generate an intermediate output, or perform post-processing operations on the intermediate output to generate a final output. An artificial neural network may include thousands or more of processing nodes and millions or more of parameters.

When the integrated circuit device includes multiple execution engines, in various examples, the compiler can produce sets of instructions for each execution engine. The instructions for an execution engine can includes steps such as reading data from memory of the device, performing a computation on the data, and writing a result of the computation back to the memory of the device. In some examples, the execution engines can asynchronously and independently execute respective sets of instructions so that the execution engines can operate in parallel.

In some instances, the compiler may include a phase referred to as a storage allocator, which attempts to assign values (or variables) that will be generated during execution to specific memories or storage locations on the integrated circuit device. While smaller values such as scalars may be assigned to low-capacity memories such as registers, larger values such as vectors, tensors, and arrays may be assigned to higher-capacity memories such as the integrated circuit device's main memory, generally consisting of dynamic random-access memory (DRAM), or other available memory on the integrated circuit device such as static random-access memory (SRAM) forming caches or scratchpad memory.

When allocating values to memories or storage locations, the storage allocator may consider the characteristics of both the values and the memories. This may include the size (capacity) of each memory, the latency associated with reading from or writing to each memory, and the organization of each memory. For values, the storage allocator may consider the size of each value, the amount of time or cycles each value will need to be stored, and the cost associated with storing or transferring each value to each memory.

Generally, the storage allocator attempts to assign as many values as possible to low-latency memory, such as registers and other SRAM. Values that are unable to be assigned to the low-latency memory are "spilled" and assigned to high-latency memory, such as the main memory or other DRAM. For each type of memory, the storage allocator may employ a different algorithm for fitting as many values as possible. For example, the problem of packing scalars into registers is called register allocation and is usually approached using either linear-scan allocation or graph-coloring allocation. In contrast, the problem of packing vectors into one-dimensional memory may be unable to be reduced to graph coloring, so the compiler may employ alternative techniques. Despite the progress of current storage allocators and storage allocation algorithms, new techniques to improve storage allocation are needed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the present disclosure provide for compiler-driven techniques for performing a storage allocation to allocate values to a memory. The described techniques may include the construction of an interference graph and the computation of various memory metrics based on the interference graph and the values contained therein. The memory metrics may include a number of possible placements in the memory for the values, a number of blocked placements in the memory for the values, a number of remaining placements in the memory for the values, among other possibilities. Based on these memory metrics, the values may be assigned to memory locations in the memory or marked to be spilled to a second higher-latency memory. The described techniques are suitable for values or memories of any dimensionality.

In some embodiments, the task of performing a storage allocation can be generalized as follows. Consider a memory M of dimension D of size equal to $M.s1 \times M.s2 \times \ldots \times M.sD$, where M.s1 is the length of the first dimension, M.s2 is the length of the second dimension, and so on. Consider a set of N values V defined as $V=\{v1, v2, \ldots, vN\}$, where each value v has a size equal to $v.s1 \times v.s2 \times \ldots \times v.sD$. In some embodiments, an interference graph may be constructed that is made up of a set of nodes representing the set of values V and a set of undirected edges E defined as $E=\{e1, e2, \ldots\}$. In some embodiments, each edge connects a pair of nodes that represent values that interfere with each other.

In some embodiments, the compiler may construct the interference graph by determining which values need to be stored in the memory at the same time (e.g., they are simultaneously live at some point in the program) and therefore cannot overlap or occupy any of the same memory locations. In some embodiments, the compiler may calculate a spill cost for each value that gives the cost of failing to assign the value to the memory. For each value v in V, the algorithm may either spill the value or assign the value a memory address A defined as $A=[v.a1, v.a2, \ldots, v.aD]$. One goal of the storage allocation algorithm may be to assign values to memory locations in M, respecting the constraints of the interference graph, such that the total spill cost is minimized.

In some embodiments, the compiler may generate a set of memory location assignments while traversing the interference graph. The interference graph may be traversed during both a simplification process and a rebuilding process. During the simplification process, values may be repeatedly removed from the interference graph, one or more at a time, based on some measure indicative of the difficulty of assigning the value to a memory location (e.g., based on the memory metrics). During the rebuilding process, the values may be added back into the interference graph in the opposite order in which they were removed. As the values are added back, they may be assigned to memory locations such that values that interfere do not overlap in memory.

FIGS. 1A and 1B illustrate an example construction of an interference graph 104 based on sample computer code 102, in accordance with some embodiments. Interference graph 104 may include a set of values 106 (or, alternatively, interference graph 104 may be considered to include a set of nodes representing values 106) and a set of interferences 108 connecting values 106 (or, alternatively, interference graph 104 may be considered to include a set of edges representing interferences 108). For example, two values (or nodes) connected by an interference (or edge) in interference graph 104 may be considered to interfere with each other during execution of computer code 102 on the target integrated circuit device.

In the illustrated example of FIG. 1A, computer code 102 forms a program that includes 8 lines of instructions that include line 1 through line 8. At lines 1 and 2, values A and B are defined, respectively. At line 3, value C is calculated as the sum of values A and B. At line 4, value D is calculated as the sum of values A and C. At line 5, value E is calculated as the difference between values A and B. At line 6, value F is calculated as the sum of values B and E. At line 7, value G is calculated as the sum of values D and F. At line 8, value G is written. In various implementations, one or more of values A through G may be scalars, vectors, tensors, arrays, among other possibilities.

In some embodiments, the compiler may construct interference graph 104 by performing a backwards walk across computer code 102, maintaining a list of live values or variables and collecting interferences 108. For example, the compiler may determine that, between lines 7 and 8, only value G is live. Between lines 6 and 7, the compiler may determine that values D and F are live. Because value F is defined at line 6, the compiler may make value F interfere with value D. Between lines 5 and 6, the compiler may determine that values B, D, and E are live. Because value E is defined at line 5, the compiler may make value E interfere with values B and D.

Between lines 4 and 5, the compiler may determine that values A, B, and D are live. Because value D is defined at line 4, the compiler may make value D interfere with values A and B. Between lines 3 and 4, the compiler may determine that values A, B, and C are live. Because value C is defined at line 3, the compiler may make value C interfere with values A and B. Between lines 2 and 3, the compiler may determine that values A and B are live. Because value B is defined at line 2, the compiler may make value B interfere with value A. Between lines 1 and 2, the compiler may determine that only value A is live. These determined interferences are reflected in interference graph 104.

Figure 2A:
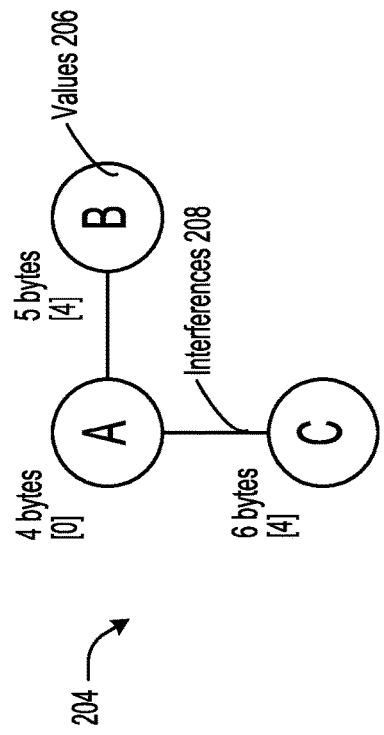
FIGS. 2A-2C illustrate an example storage allocation of values into a memory.
Figure 2B:
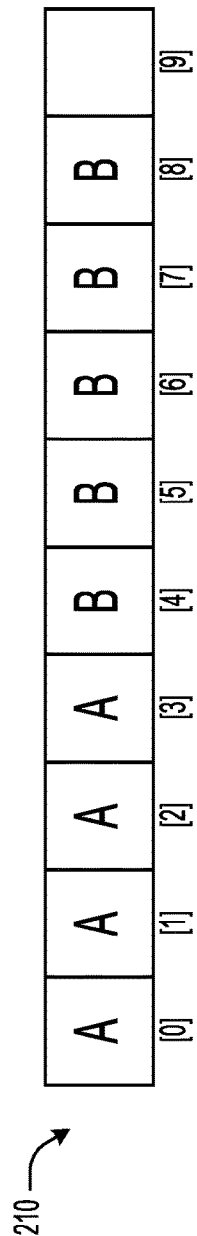
Figure 2C:
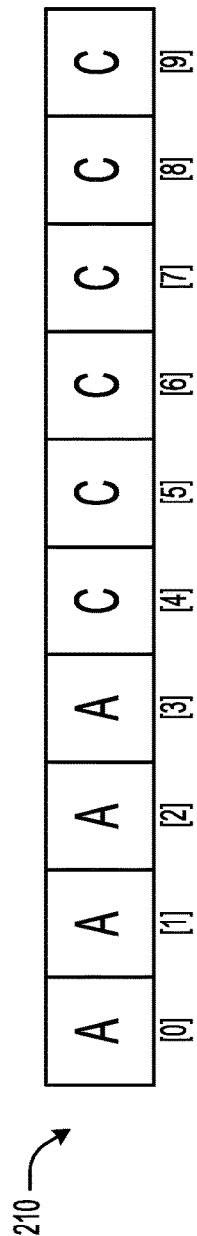

FIGS. 2A-2C illustrate an example storage allocation of values 206 into a memory 210, in accordance with some embodiments. In the illustrated example, memory 210 is a one-dimensional memory capable of storing 10 bytes of data at memory locations [0] through [9]. Each of values 206 may also be one-dimensional so that they are suitable for storage in memory 210. The compiler may construct an interference graph 204 that includes values 206 connected by interferences 208, including an interference between values A and B and another interference between values A and C.

In FIG. 2A, each of values 206 is annotated with the number of bytes the value requires, with value A being 4 bytes, value B being 5 bytes, and value C being 6 bytes. FIG. 2A also shows the memory location in memory 210 that the compiler assigns for each of values 206, with value A being assigned to memory location [0], value B being assigned to memory location [4], and value C being assigned to memory location [4]. The simultaneous storage of values A and B, which interfere, is shown in FIG. 2B, and the simultaneous storage of values A and C, which interfere, is shown in FIG. 2C. Since values B and C do not interfere, the compiler does not determine a storage allocation in which values B and C are simultaneously stored in memory 210.

It should be noted that, while the illustrated example storage allocation may appear simplistic, there are many ways in which the packing of the values could become problematic. For example, if the compiler had allocated value A starting at memory location [1], it would not have been possible to allocate value C in memory 210. Indeed, if value A had been allocated starting anywhere except memory locations [0] or [6], the compiler would be unable to allocate value C.

Figures 3A, 3B, 3C:
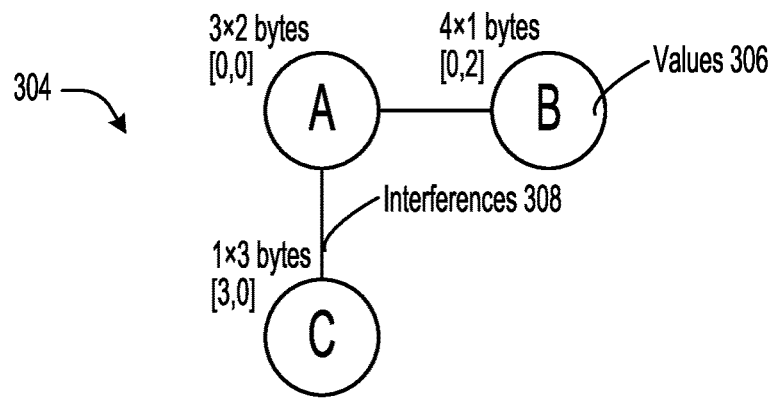
FIGS. 3A-3C illustrate an example storage allocation of values into a memory.

FIGS. 3A-3C illustrate an example storage allocation of values 306 into a memory 310, in accordance with some embodiments. In the illustrated example, memory 310 is a two-dimensional memory capable of storing 4×3 bytes of data, with 4 bytes in the X dimension and 3 bytes in the Y dimension. Memory 310 includes memory location indices [0] through [3] in the X dimension and memory location indices [0] through [2] in the Y dimension. Each of values 306 may be one- or two-dimensional so that they are suitable for storage in memory 310. The compiler may construct an interference graph 304 that includes values 306 connected by interferences 308, including an interference between values A and B and another interference between values A and C.

In FIG. 3A, each of values 306 is annotated with the number of bytes the value requires, with value A being 3×2 bytes, value B being 4×1 bytes, and value C being 1×3 bytes. FIG. 3A also shows the memory location in memory 310 that the compiler assigns for each of values 306, with value A being assigned to memory location [0,0], value B being assigned to memory location [0,2], and value C being assigned to memory location [3,0]. The simultaneous storage of values A and B, which interfere, is shown in FIG. 3B, and the simultaneous storage of values A and C, which interfere, is shown in FIG. 3C. Since values B and C do not interfere, the compiler does not determine a storage allocation in which values B and C are simultaneously stored in memory 310.

FIGS. 4A-4G illustrate an example calculation of a number of possible placements of a value in a one-dimensional memory 410, in accordance with some embodiments. In some embodiments, as a step in the storage allocation algorithm, the compiler may determine the number of possible placements for each value, i.e., the number of ways that a particular value can be placed in a particular memory. In the illustrated example, memory 410 is a one-dimensional memory capable of storing 10 bytes of data at memory locations [0] through [9] (memory location indices not shown) and value A is a one-dimensional value with 4 bytes.

Figure 4A:
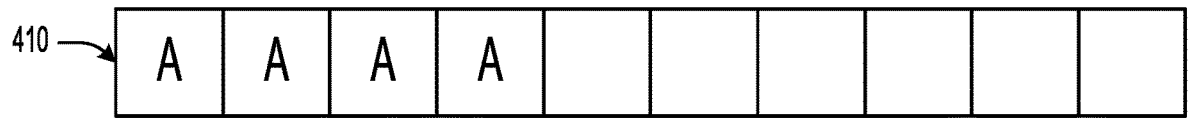
FIGS. 4A-4G illustrate an example calculation of a number of possible placements of a value in a one-dimensional memory.
Figure 4B:
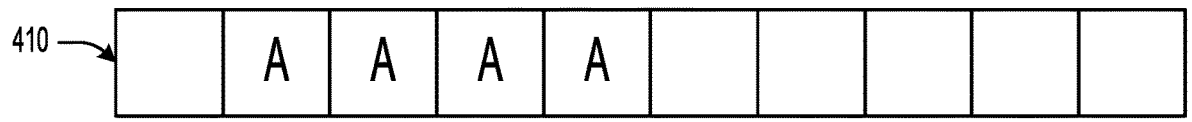
Figure 4C:
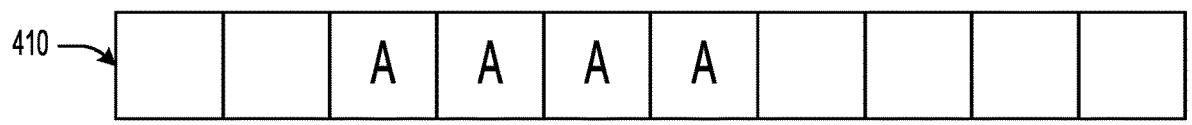
Figure 4D:
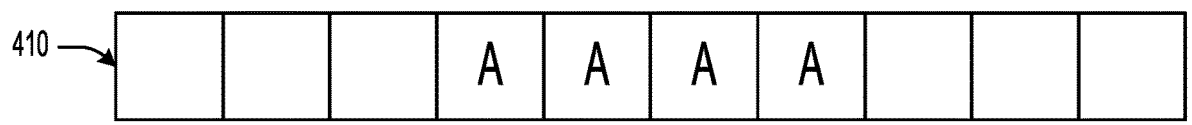
Figure 4E:
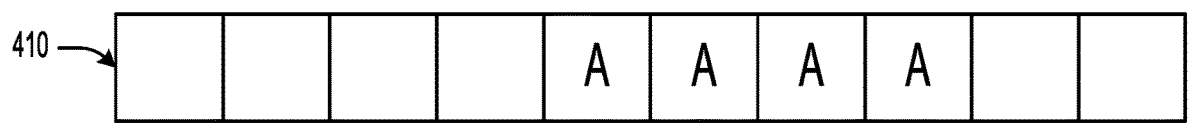
Figure 4F:
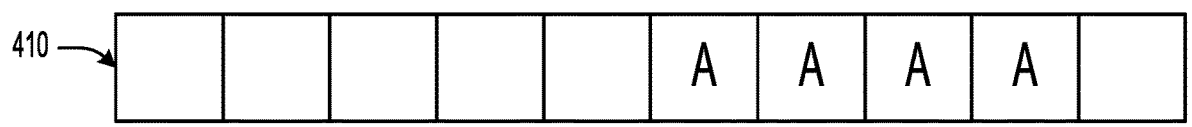
Figure 4G:
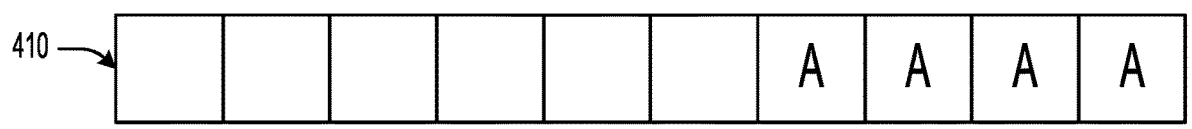

The compiler may determine that there are seven possible placements of value A in memory 410, including a first placement at memory location [0] (shown in FIG. 4A), a second placement at memory location [1] (shown in FIG. 4B), a third placement at memory location [2] (shown in FIG. 4C), a fourth placement at memory location [3] (shown in FIG. 4D), a fifth placement at memory location [4] (shown in FIG. 4E), a sixth placement at memory location [5] (shown in FIG. 4F), and a seventh placement at memory location [6] (shown in FIG. 4G). It can be observed that, in the one-dimensional case, the general formula for the number of possible placements may be possible_placements=$M.s-V.s+1$.

In some implementations, the computation of the number of possible placements may be affected by the alignment restrictions of certain hardware. In such implementations, the storage of values may be restricted to a subset of the possible memory locations. As an example, in the context of FIGS. 4A-4G, the alignment restrictions of certain hardware may limit the possible placements of value A to only those shown in FIGS. 4A, 4C, 4D, and 4G. As another example, again in the context of FIGS. 4A-4G, the alignment restrictions of certain hardware may limit the possible placements of value A to only those shown in FIGS. 4A and 4E. Other possibilities are contemplated.

FIGS. 5A-5D illustrate an example calculation of a number of possible placements of a value in a two-dimensional memory 510, in accordance with some embodiments. In the illustrated example, memory 510 is a two-dimensional memory capable of storing 4×3 bytes of data, with 4 bytes in the X dimension and 3 bytes in the Y dimension. Memory 510 includes memory location indices [0] through [3] in the X dimension and memory location indices [0] through [2] in the Y dimension. Value A is a two-dimensional value with 3×2 bytes.

Figures 5A, 5B, 5C, 5D:
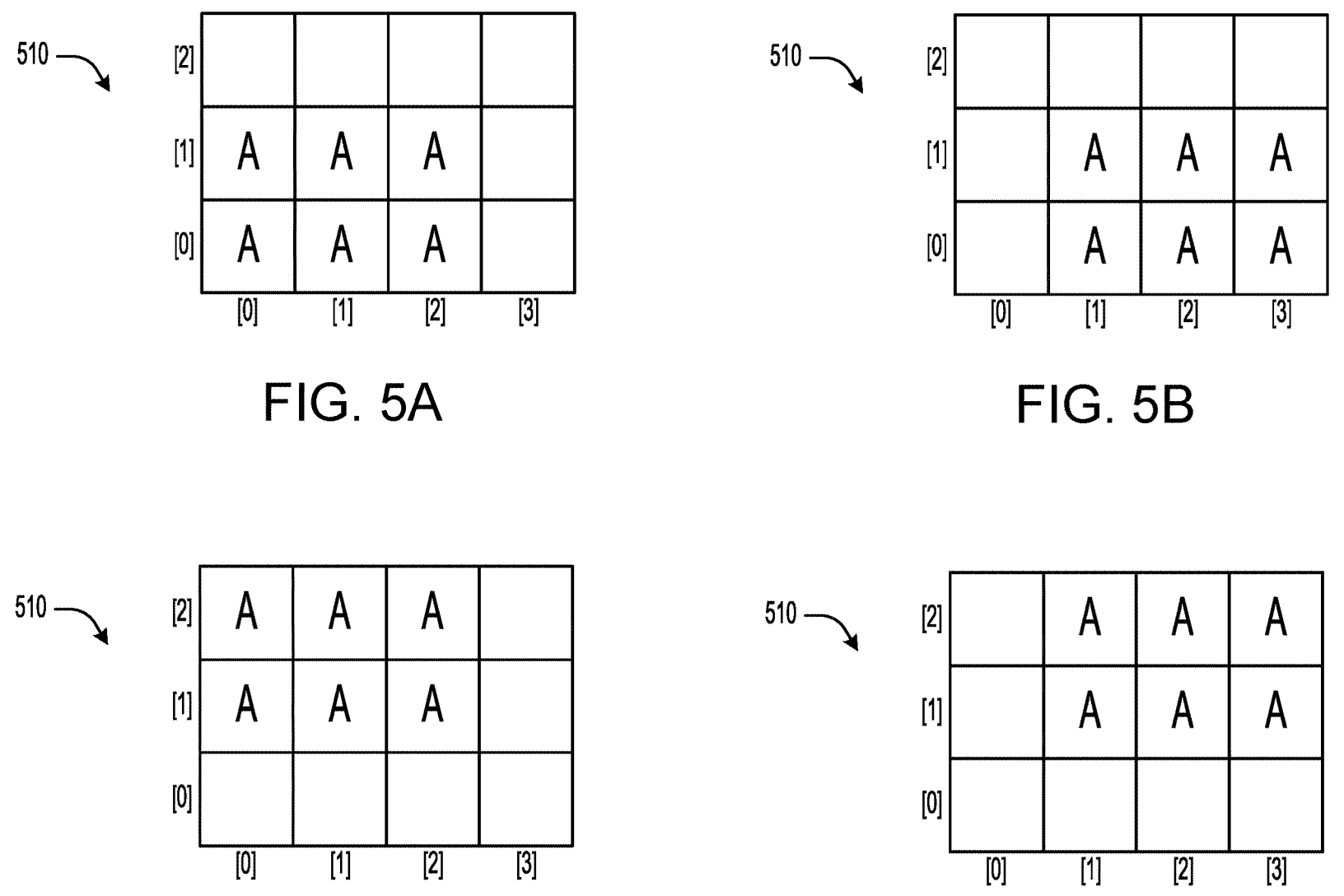

The compiler may determine that there are four possible placements of value A in memory 510, including a first placement at memory location [0,0] (shown in FIG. 5A), a second placement at memory location [1,0] (shown in FIG. 5B), a third placement at memory location [0,1] (shown in FIG. 5C), and a fourth placement at memory location [1,1] (shown in FIG. 5D).

It can be observed that, for two-dimensional values, the compiler can determine the number of placements by working one dimension at a time. For example, for a two-dimensional value that needs 3×2 bytes data in a memory that is organized as 4×3 bytes, value A has two horizontal placements and two vertical placements, resulting in 2×2=4 possible placements. The general formula for the number of placements may be possible_placements=horizontal_placements×vertical_placements where horizontal_placements=$M.s1-V.s1+1$ and vertical_placements=$M.s2-V.s2+1$. This formula can be extended to N dimensions by computing the number of possible placements in each dimension and then computing their product to yield the total number of possible placements.

Figure 6:
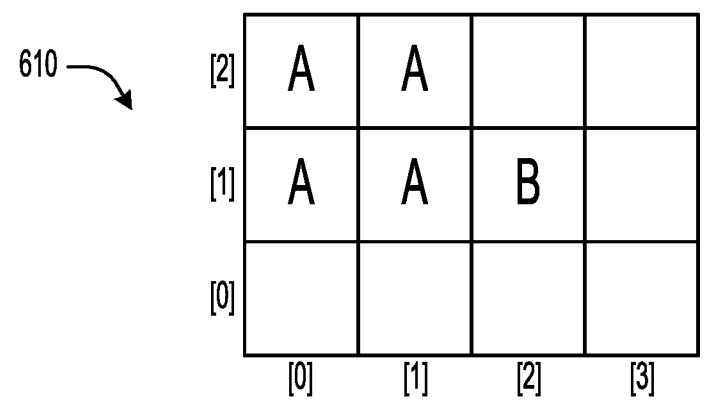

FIG. 6 illustrates an example calculation of a number of blocked placements of a value in a two-dimensional memory 610, in accordance with some embodiments. In some embodiments, as a step in the storage allocation algorithm, the compiler may determine the number of blocked placements for each value and/or for each pair of values. The number of blocked placements may be the number of ways that a possible placement of one value can be blocked by a possible placement of another value.

If values A and B interfere (are connected by an edge in the interference graph), then value A will block some of value B's possible placements, and vice versa. It can be shown that this relationship is symmetrical. That is, if value A blocks some number of placements of value B, then value B will block the same number of placements of value A. If values A and B are one-dimensional values, value A can block, in the worst case, A.s+B.s−1 of value B's placements, and vice versa. For example, if value A is 2 bytes long and the target memory is 10 bytes, then value A has nine possible placements. If value A interferes with value B and value B is 1 byte long, then value B can block two of value A's placements, in the worst case. Similarly, value B will have 10 placements, but value A can block up to two of them.

If values A and B are two-dimensional values, then the two dimensions can be treated independently by multiplying the number of block placements in each dimension to find the total number of blocked placements. For example, the horizontal dimension of the total may be computed as A.s1+B.s1−1 and the vertical dimension of the total may be computed as A.s2+B.s2−1. Accounting for both horizontal and vertical dimensions, value A can block, in the worst case, (A.s1+B.s1−1)×(A.s2+B.s2−1) of B's placements, and vice versa.

In the illustrated example, memory 610 is a two-dimensional memory capable of storing 4×3 bytes of data, value A is a two-dimensional value with 2×2 bytes, value B is a one-dimensional value with 1 byte, and values A and B interfere. The above-described formulas indicate that value A has 6 possible placements and value B has 12 possible placements, and that value A blocks 4 of value B's placements and vice versa, leaving 2 possible placements for value A and 8 possible placements for value B. As shown in FIG. 6, with value B occupying one of the center positions (the worst case), it can be observed that value A has only 2 remaining placements. Similarly, it can be observed that wherever value A is placed, value B has 8 remaining placements. These formulas can be extended to any number of dimensions.

In some embodiments, the compiler may determine the total number of blocked placements for each value. For example, if value A has several interferences, then each interfering value will block some placements of value A. Adding the blocked placements contributed by each neighbor, the total blocked placements for a value can be found by summing the blocked placements by each neighbor. If the number of possible placements if greater than the total blocked placements, then the compiler can be certain that value A will have a placement, regardless of where the rest of the values are allocated.

FIGS. 7A-7G illustrate example steps for a simplification process of a storage allocation algorithm, in accordance with some embodiments. In some embodiments, the goal of the storage allocation may be to place all the values in the interference graph in the memory M, where the interference graph has some value V with more possible placements than total blocked placements. Since the compiler is certain that value V can be allocated, the problem can be reduced to placing all the values in a reduced interference graph, where the reduced interference graph is the result of omitting value V and all of its edges from the interference graph. In this manner, the storage allocation algorithm reduces the interference graph by removing all values that have more possible placements than total blocked placements.

This process can cascade until the entire graph has been removed. That is, until the problem is reduced to placing values from the empty graph. Thereafter, values are added back into the interference graph in the inverse order in which they were removed. As each value is restored, a memory address is selected for the value. The algorithm encounters a decision point if, at some point, the reduced interference graph only has values with possible placements less than or equal to total blocked placements. If this happens, the compiler may have to choose some value to spill, modify the program to reflect this decision, and reconsider the modified program.

In the illustrated example, an interference graph 704 with 7 values 706 is repeatedly reduced, one value at a time, until interference graph 704 is left with a single value (or, in some embodiments, until interference graph 704 is empty). Values 706 are connected by interferences 708, indicating which pairs of values 706 have been determined to interfere with each other. Each of the edges representing interferences 708 in interference graph 704 is labeled with the number of blocked placements between the connected values. In the illustrated example, it is assumed that the compiler has determined that each of values 706 has 20 possible placements, with the edge labels giving the number of blocked placements between interfering pairs of values.

By adding the number of blocked placements, the total blocked placements can be computed for a value. For example, value A has a total of 7 blocked placements (e.g., 4+2+1=7), value B has a total of 25 blocked placements (e.g., 1+3+6+8+7=25), value C has a total of 28 blocked placements (e.g., 7+10+11=28), and so on. By subtracting the total blocked placements from the possible placements, a number of remaining placements can be computed for a value. For example, value A has 13 remaining placements (e.g., 20−7=13), value B has −5 remaining placements (e.g., 20−25=−5), value C has −8 remaining placements (e.g., 20−28=−8), and so on.

To simplify interference graph 704, the compiler looks for an arbitrary value with a number of remaining placements greater than or equal to one or, equivalently, a value with more possible placements than total blocked placements. For instance, value D has 20 possible placements and only 11 total blocked placements, so the compiler is certain that it can place value D, regardless of how other values in interference graph 704 are assigned. As such, value D and its edge may be removed from interference graph 704, as shown by the transition from FIG. 7A to FIG. 7B.

Figure 7A:
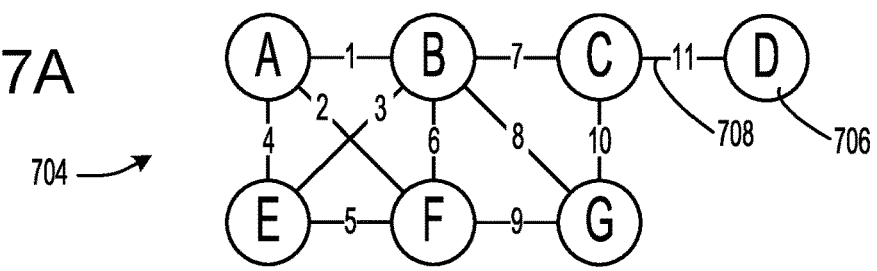
FIGS. 7A-7G illustrate example steps for a simplification process of a storage allocation algorithm.
Figure 7B:
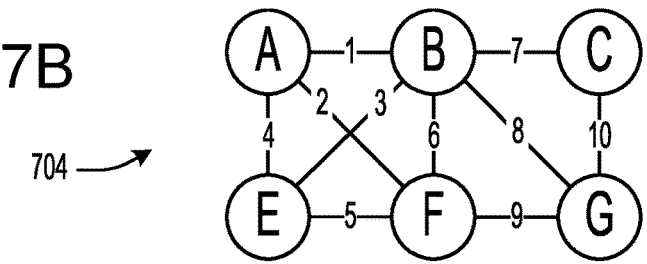
Figure 7C:
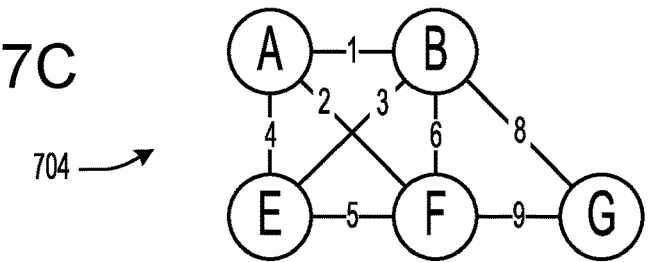
Figure 7D:
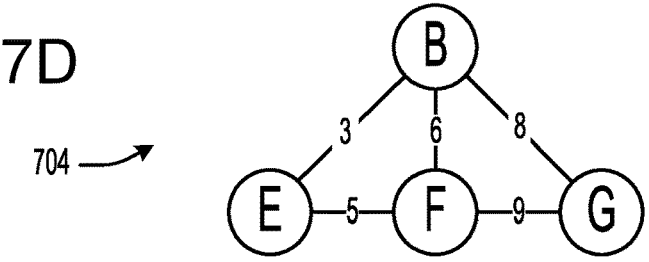
Figure 7E:
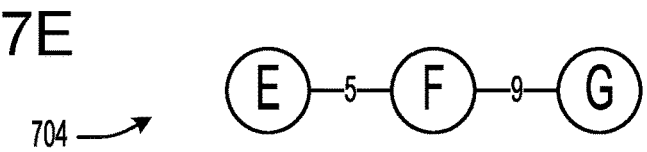
Figure 7F:
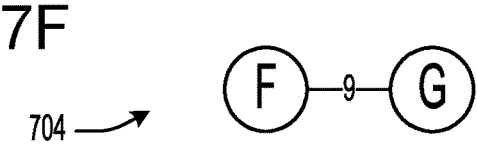
Figure 7G:

In FIG. 7B, the total block placements for value C is recalculated to be 17 (down from 28 in FIG. 7A), which is less than its 20 possible placements (and yields 3 remaining placements). As such, value C and its edges may be removed from interference graph 704, as shown by the transition from FIG. 7B to FIG. 7C. Removing value C along with its edges decreases the total blocked placements and increases the remaining placements for its neighbors, values B and G. Following this same process, value A is removed in FIG. 7D, value B is removed in FIG. 7E, value E is removed in FIG. 7F, and value G is removed in FIG. 7G.

Each time one of values 706 is removed from interference graph 704, the compiler records that the value was removed by, for example, adding the value to a stack. The order that the values are added to the stack is tracked so that the values can be brought back to interference graph 704 in the opposite order (last in, first out) during the rebuilding process. As each of values 706 is restored to interference graph 704, the compiler finds a place for it in the target memory such that it doesn't overlap with any of its neighbors.

Figure 8A:
FIGS. 8A-8G illustrate example steps for a rebuilding process of a storage allocation algorithm.
Figure 8B:
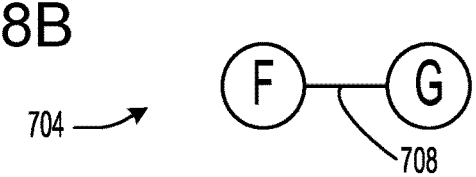

FIGS. 8A-8G illustrate example steps for a rebuilding process of a storage allocation algorithm, in accordance with some embodiments. In some embodiments, the example steps shown in FIGS. 8A-8G may be performed after the example steps shown in FIGS. 7A-7G. In FIG. 8A, the compiler determines that value F is the last remaining value in interference graph 704 (or, in some embodiments, value F may be the last value removed from interference graph 704) and, in response, the compiler places value F in the target memory. In FIG. 8B, the compiler determines that value G was the last value removed from interference graph 704 (and the last value added to the stack) and, in response, the compiler restores value G to interference graph 704 and places value G in the target memory so that it doesn't overlap with value F.

Figure 8C:
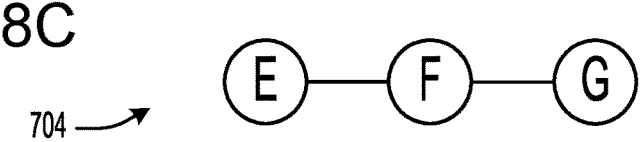
Figure 8D:
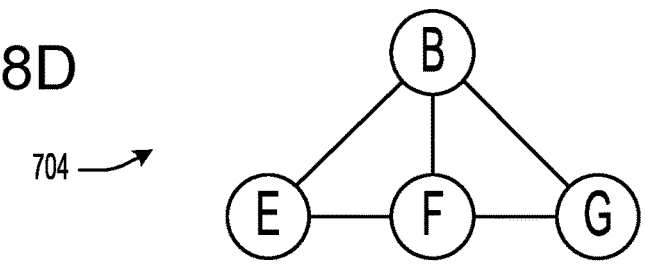
Figure 8E:
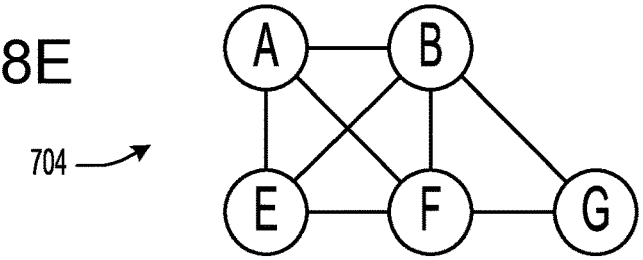

In FIG. 8C, the compiler determines that value E was the second-to-last value removed from interference graph 704 (and the second-to-last value added to the stack) and, in response, the compiler restores value E to interference graph 704 and places value E in the target memory so that it doesn't overlap with value F. In FIG. 8D, the compiler determines that value B was the third-to-last value removed from interference graph 704 (and the third-to-last value added to the stack) and, in response, the compiler restores value B to interference graph 704 and places value B in the target memory so that it doesn't overlap with values E, F, or G. In FIG. 8E, the compiler determines that value A was the fourth-to-last value removed from interference graph 704 (and the fourth-to-last value added to the stack) and, in response, the compiler restores value A to interference graph 704 and places value A in the target memory so that it doesn't overlap with values B, E, or F.

Figure 8F:
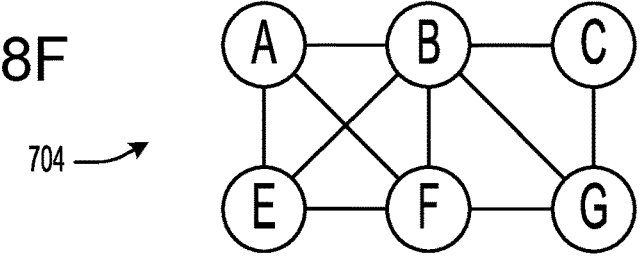
Figure 8G:
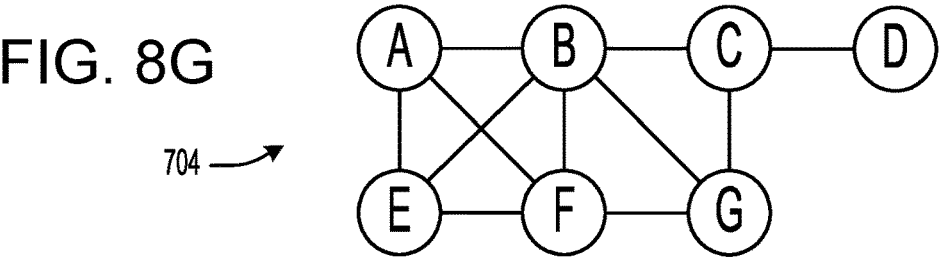

In FIG. 8F, the compiler determines that value C was the fifth-to-last value removed from interference graph 704 (and the fifth-to-last value added to the stack) and, in response, the compiler restores value C to interference graph 704 and places value C in the target memory so that it doesn't overlap with values B or G. In FIG. 8G, the compiler determines that value D was the sixth-to-last value removed from interference graph 704 (and the sixth-to-last value added to the stack) and, in response, the compiler restores value D to interference graph 704 and places value D in the target memory so that it doesn't overlap with value C. The described scheme for simplifying and rebuilding the interference graph ensures that the compiler is able to find a place for each of values 706.

FIGS. 9A-9G illustrate example steps for a simplification process of a storage allocation algorithm, in accordance with some embodiments. In the illustrated example, an interference graph 904 with 7 values 906 is repeatedly reduced, one value at a time. Values 906 are connected by interferences 908, indicating which pairs of values 906 have been determined to interfere with each other. Each of the edges representing interferences 908 in interference graph 904 is labeled with the number of blocked placements between the connected values. In the illustrated example, it is assumed that the compiler has determined that each of values 906 has 15 possible placements, with the edge labels giving the number of blocked placements between interfering pairs of values.

Figure 9A:
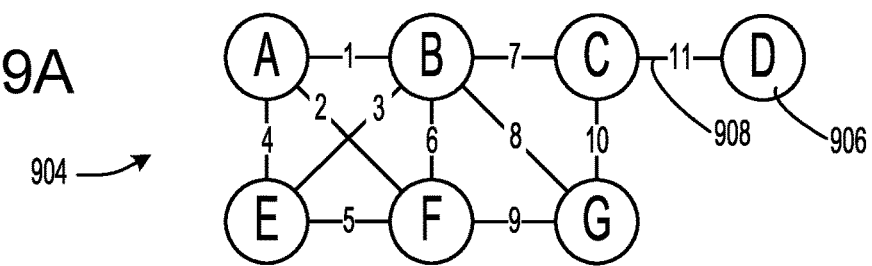
FIGS. 9A-9G illustrate example steps for a simplification process of a storage allocation algorithm.
Figure 9B:
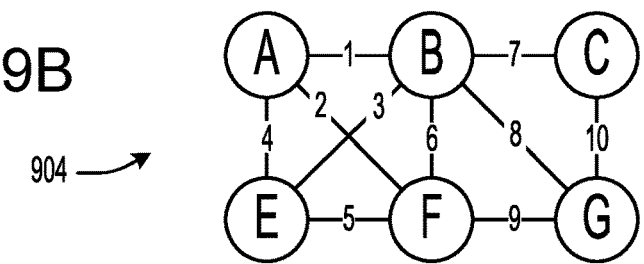
Figure 9C:
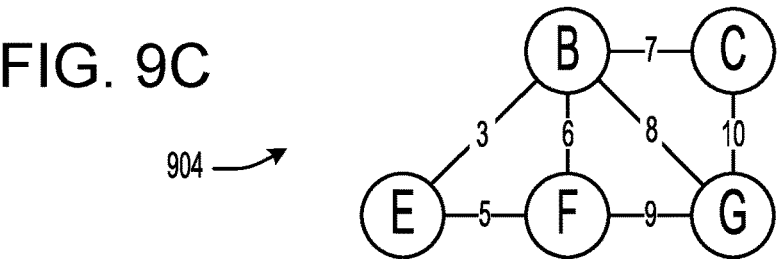

In FIG. 9A, the compiler looks for an arbitrary value with a number of remaining placements greater than or equal to one or, equivalently, a value with more possible placements than total blocked placements. The compiler may determine that value D has 15 possible placements, 11 total blocked placements, and therefore 4 remaining placements and, in response, the compiler may remove value D, as shown by the transition from FIG. 9A to FIG. 9B. In FIG. 9B, the compiler may determine that value A has 15 possible placements, 7 total blocked placements (e.g., 4+2+1=7), and therefore 8 remaining placements and, in response, the compiler may remove value A, as shown by the transition from FIG. 9B to FIG. 9C. In FIG. 9C, the compiler may determine that value E has 15 possible placements, 8 total blocked placements (e.g., 5+3=8), and therefore 7 remaining placements and, in response, the compiler may remove value E, as shown by the transition from FIG. 9C to FIG. 9D.

Figure 9D:
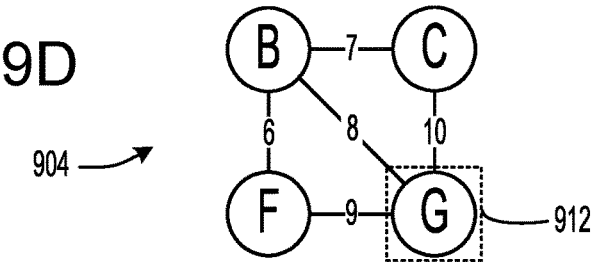

In FIG. 9D, the compiler may determine that none of values B, C, F, and G has a number of remaining placements greater than or equal to one. Equivalently, the compiler may determine that none of values B, C, F, and G has more possible placements than total blocked placements. In some embodiments, the compiler may select one of the remaining values to be a spill candidate 912 and may remove the selected value from interference graph 904. In the illustrated example, value G may be selected to be spill candidate 912 since it has the lowest number of remaining placements, -12 (e.g., 15-9-8-10=-12). Alternatively or additionally, value G may be selected to be spill candidate 912 since it has the highest number of total blocked placements, 27 (e.g., 9+8+10=27).

Figure 9E:
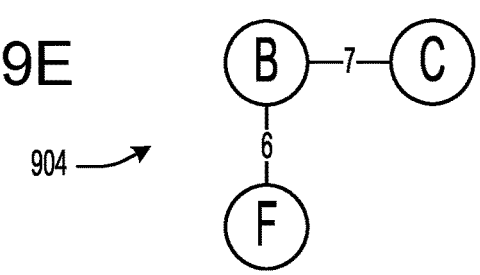
Figure 9F:
Figure 9G:
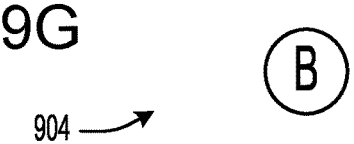

In FIG. 9E, the compiler may determine that value F has 15 possible placements, 6 total blocked placements, and therefore 9 remaining placements and, in response, the compiler may remove value F, as shown by the transition from FIG. 9E to FIG. 9F. In FIG. 9F, the compiler may determine that value C has 15 possible placements, 7 total blocked placements, and therefore 8 remaining placements and, in response, the compiler may remove value C, as shown by the transition from FIG. 9F to FIG. 9G.

Figure 10A:
FIGS. 10A-10G illustrate example steps for a rebuilding process of a storage allocation algorithm.
Figure 10B:
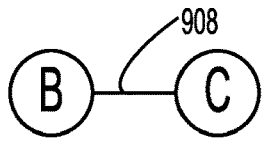
Figure 10C:
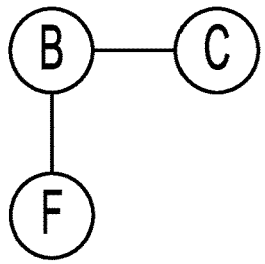

FIGS. 10A-10G illustrate example steps for a rebuilding process of a storage allocation algorithm, in accordance with some embodiments. In some embodiments, the example steps shown in FIGS. 10A-10G may be performed after the example steps shown in FIGS. 9A-9G. In FIG. 10A, the compiler determines that value B is the last remaining value in interference graph 904 (or, in some embodiments, value B may be the last value removed from interference graph 904) and, in response, the compiler places value B in the target memory. In FIG. 10B, the compiler determines that value C was the last value removed from interference graph 904 (and the last value added to the stack) and, in response, the compiler restores value C to interference graph 904 and places value C in the target memory so that it doesn't overlap with value B. In FIG. 10C, the compiler determines that value F was the second-to-last value removed from interference graph 904 (and the second-to-last value added to the stack) and, in response, the compiler restores value F to interference graph 904 and places value F in the target memory so that it doesn't overlap with value B.

Figure 10D:
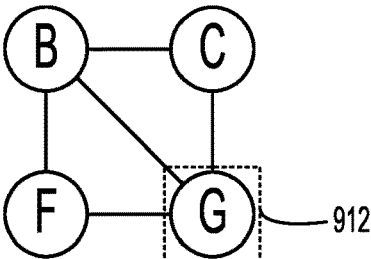

In FIG. 10D, the compiler determines that value G was the third-to-last value removed from interference graph 904

(and the third-to-last value added to the stack). Furthermore, the compiler determines that value G was spill candidate 912 and, in response, the compiler attempts to place value G in the target memory so that it doesn't overlap with values B, C, or F. If the compiler is successful in placing value G in the target memory (which is possible since the number of total blocked placements reflects the worst case scenario), then value G is restored to interference graph 904 and the regular rebuilding process continues. If the compiler is unable to place value G in the target memory, then value G is marked for spilling and the rebuilding process continues without restoring value G to interference graph 904 (not shown). To spill value G, the compiler may generate code so that value G is not stored in the target memory but is assigned/stored in a separate memory, such as a high-latency memory.

Figure 10E:
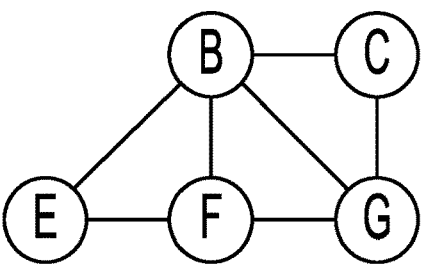
Figure 10F:
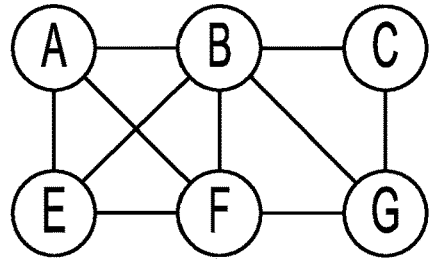
Figure 10G:
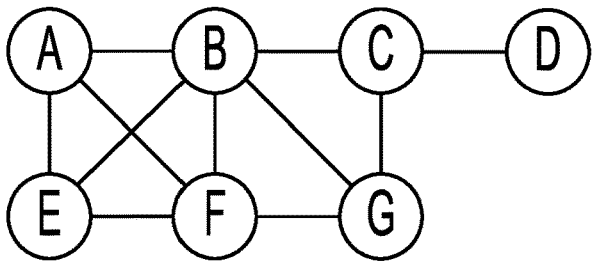

In FIG. 10E, the compiler determines that value E was the fourth-to-last value removed from interference graph 904 (and the fourth-to-last value added to the stack) and, in response, the compiler restores value E to interference graph 904 and places value E in the target memory so that it doesn't overlap with values B or F. In FIG. 10F, the compiler determines that value A was the fifth-to-last value removed from interference graph 904 (and the fifth-to-last value added to the stack) and, in response, the compiler restores value A to interference graph 904 and places value A in the target memory so that it doesn't overlap with values B, E, or F. In FIG. 10G, the compiler determines that value D was the sixth-to-last value removed from interference graph 904 (and the sixth-to-last value added to the stack) and, in response, the compiler restores value D to interference graph 904 and places value D in the target memory so that it doesn't overlap with value C.

Figure 11:
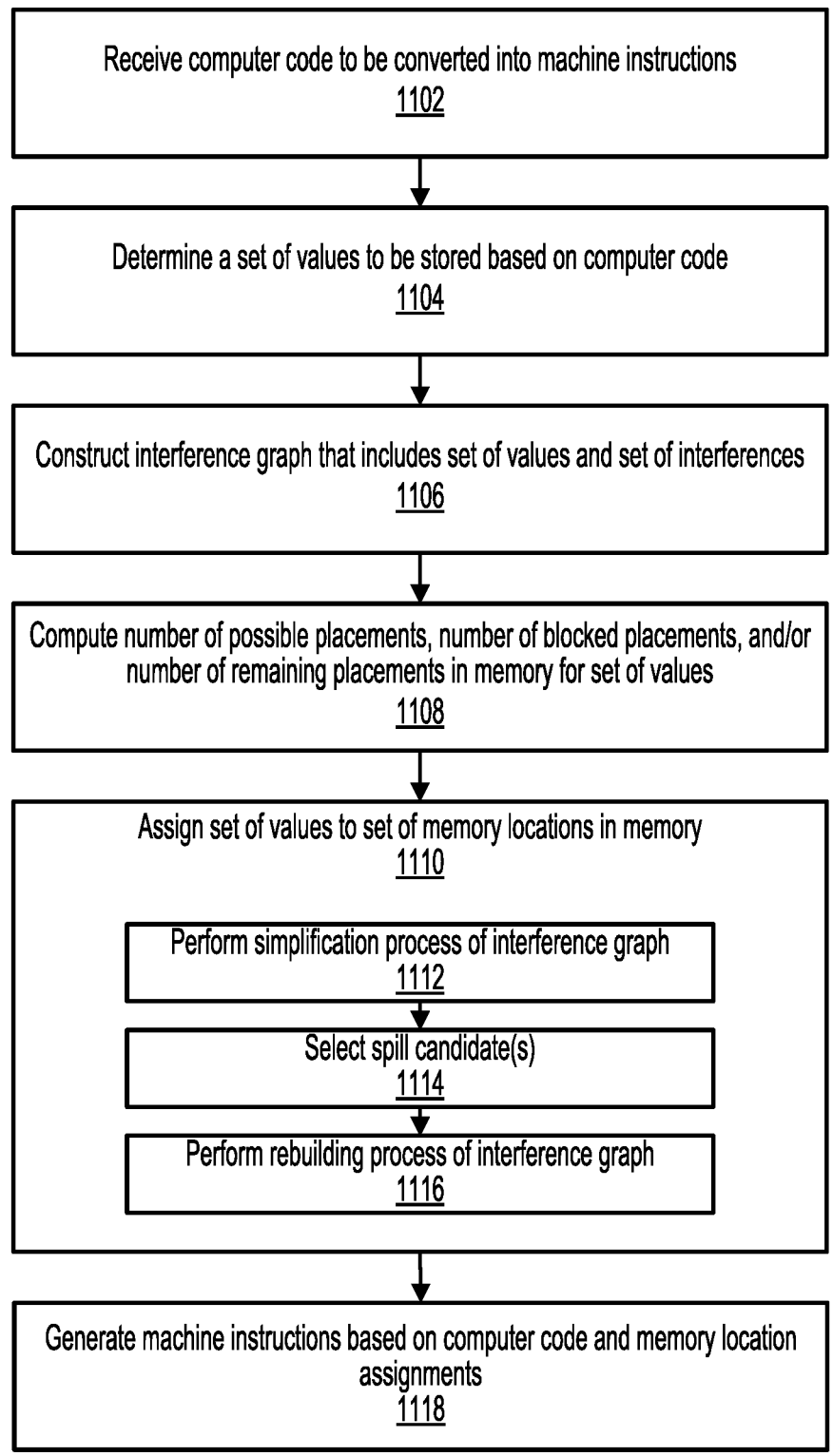
FIG. 11 illustrates a compiler-implemented method for performing a storage allocation.

FIG. 11 illustrates a compiler-implemented method 1100 for performing a storage allocation, in accordance with some embodiments. One or more steps of method 1100 may be omitted during performance of method 1100, and steps of method 1100 may be performed in any order and/or in parallel. One or more steps of method 1100 may be performed by one or more processors. Method 1100 may be implemented as a computer-readable medium or computer program product comprising instructions which, when the program is executed by one or more computers, cause the one or more computers to carry out the steps of method 1100. Such computer program products can be transmitted, over a wired or wireless network, in a data carrier signal carrying the computer program product.

At step 1102, computer code (e.g., computer code 102) is received. The computer code may be received by a compiler and/or a storage allocator of the compiler. The computer code may be an intermediate representation of source code. In some embodiments, the computer code may be generated by a different phase of the compiler such as, for example, the front end or the middle end of the compiler. The computer code may be received for the purpose of being converted into machine instructions for execution on an integrated circuit device.

At step 1104, a set of values (e.g., values 106, 206, 306, 706, or 906) that are to be stored on the integrated circuit device during the execution of the machine instructions on the integrated circuit device are determined. The set of values may be determined based on the computer code. Each of the set of values may be a scaler, a vector, a tensor, an array, among other possibilities. In various examples, one or more of the set of values may be inputs used by the computer code, outputs generated by the computer code, temporary values utilized by the computer code for generating the outputs based on the inputs, weights or other parameters used in mathematical operations carried out by the computer code, among other possibilities.

In some embodiments, the integrated circuit device may include a processor and a memory (e.g., memories 210, 310, 410, 510, or 610) having a set of memory locations. The memory may be a one-dimensional memory, a two-dimensional memory, an N-dimensional memory, or any memory suitable for storing the set of values. The memory may be a low-latency memory. For example, the memory may include one or more processor registers, a scratchpad memory, or a cache. In some embodiments, the integrated circuit device may further include a second memory separate from the memory. The second memory may be a high-latency memory such as main memory. In some embodiments, the memory may be SRAM and the second memory may be DRAM.

Each of the set of memory locations in the memory may be capable of storing all or a portion of a single value from the set of values. For example, a first value from the set of values may have a size that occupies three memory locations, and as such may be stored in a position that occupies a first memory location, a second memory location, and third memory location of the set of memory locations. As another example, a second value from the set of values may have a size that occupies two memory locations, and as such may be stored in a position that occupies a fourth memory location and a fifth memory location of the set of memory locations. Since the memory location assignments for the first value and the second value do not overlap in the memory, they may be concurrently stored during the execution of the machine instructions.

At step 1106, an interference graph (e.g., interference graphs 104, 204, 304, 704, or 904) that includes the set of values and a set of interferences (e.g., interferences 108, 208, 308, 708, or 908) is constructed. The set of interferences may indicate which of the set of values are concurrently stored during the execution of the machine instructions on the integrated circuit device. In some embodiments, the compiler may analyze the computer code and determine various pairs of values that are simultaneously live during the execution of the machine instructions. The compiler may then generate an interference between each of the pairs of values, forming the set of interferences. In some embodiments, the interference graph may include a set of nodes that represent the set of values and a set of edges that represent the set of inferences.

At step 1108, one or more memory metrics may be computed for each of the set of values. The one or more memory metrics may depend on the size of the memory, the size of each of the set of values, and/or the set of interferences in the interference graph. In various embodiments, the one or more memory metrics may include a number of possible placements in the memory, a number of (total) blocked placements in the memory, and/or a number of remaining placements in the memory. In some embodiments, at step 1108, the number of possible placements in the memory is computed for each of the set of values. The number of possible placements may correspond to the number of different ways that a particular value can be placed in the memory.

In some embodiments, at step 1108, the (total) number of blocked placements in the memory is computed for each of the set of values using the interference graph. The number of blocked placements may correspond to the number of ways that a possible placement of one value can be blocked by a possible placement of another value. In some embodiments, the number of blocked placements may be first computed for each of the set of interferences, and the total number of blocked placements may then be computed for a particular value by summing each of the number of blocked placements for the connected interferences.

In some embodiments, at step 1108, the number of remaining placements in the memory is computed for each of the set of values. The number of remaining placements may be computed based on the number of possible placements and the number of blocked placements. For example, the number of remaining placements may be computed for each of the set of values as the difference between the number of possible placements in the number of blocked placements.

At step 1110, at least a portion of the set of values are assigned to the set of memory locations based on the one or more memory metrics for each of the set of values. In some embodiments, the set of values may be assigned to the set of memory locations based on the number of possible placements and the number of blocked placements for each of the set of values. In some embodiments, the set of values may be assigned to the set of memory locations based on the number of remaining placements for each of the set of values. In some embodiments, assigning the set of values to the set of memory locations results in a set of memory location assignments, which may include instructions to cause the set of values to be stored in the memory at the set of memory locations. In some embodiments, step 1110 may include one or more of steps 1112, 1114, or 1116.

At step 1112, a simplification process of the interference graph is performed. In some embodiments, performing the simplification process of the interference graph may include repeatedly removing one of the set of values from their interference graph based on the one or more memory metrics for each of the set of values (e.g., based on the number of remaining placements for each of the set of values). For example, the value having the highest number of remaining placements may be removed. In another example, any value having a number of remaining placements greater than or equal to one may be removed. The set of values may be removed from the interference graph in accordance with a first order. The first order may indicate a first removed value, a second removed value, a third removed value, and so on.

At step 1114, a value of the set of values is selected to be a spill candidate (e.g., spill candidate 912) based on the one or more memory metrics for each of the set of values. The value may be selected to be the spill candidate during the simplification process. For example, during the simplification process, if no remaining values have a number of remaining placements greater than or equal to one, one of the remaining values may be selected to be the spill candidate. In another example, during the simplification process, if no remaining values have a number of remaining placements greater than or equal to one, the remaining value with the lowest number of remaining placements may be selected to be the spill candidate.

At step 1116, a rebuilding process of the interference graph is performed. In some embodiments, performing the rebuilding process of the interference graph may include repeatedly adding one of the set of values back into the interference graph. The set of values may be added to the interference graph in accordance with a second order. The second order may be based on the first order. For example, the second order may be opposite the first order, such that the last removed value is the first added value, the second-to-last removed value is the second added value, and so on.

During the rebuilding process, the set of values may be assigned to the set of memory locations in accordance with the second order. For example, during the rebuilding process, the first added value may be assigned to one of the set of memory locations first, the second added value may be assigned to one of the set of memory locations second, the third added value may be assigned to one of the set of memory locations third, and so on. The compiler may assign the set of values to the set of memory locations in a manner such that values that interfere do not overlap in the memory.

At step 1118, the machine instructions are generated based on the computer code while incorporating the set of memory location assignments. In this manner, the machine instructions may cause the integrated circuit device to store the set of values at the set of memory locations in the memory as specified in the set of memory location assignments when the machine instructions are executed on the integrated circuit device.

Figure 12:
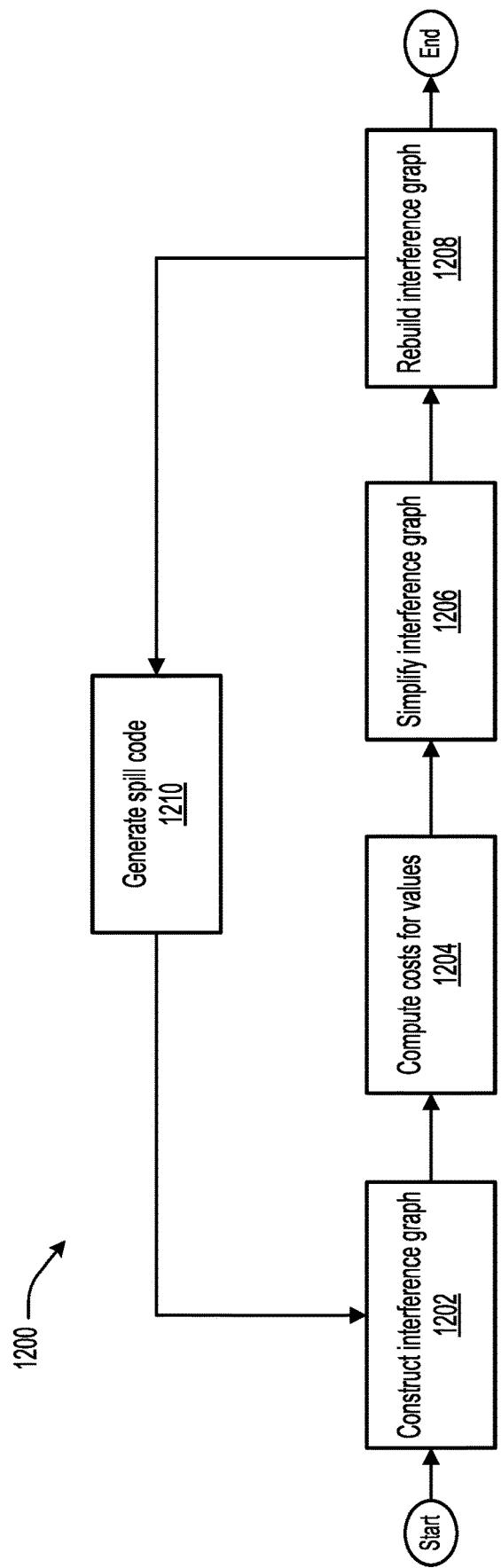
FIG. 12 illustrates a compiler-implemented method for performing a storage allocation.

FIG. 12 illustrates a compiler-implemented method 1200 for performing a storage allocation, in accordance with some embodiments. One or more steps of method 1200 may be omitted during performance of method 1200, and steps of method 1200 may be performed in any order and/or in parallel. One or more steps of method 1200 may be performed by one or more processors. Method 1200 may utilize or may be used in conjunction with one or more steps of method 1100.

At step 1202, the interference graph is constructed. Step 1202 may include elements or features from one or more of steps 1102, 1104, or 1106.

At step 1204, a spill cost is computed for each of the set of values. The spill cost for a value is an estimate of the cost penalty of not allocating the value to the memory. In some embodiments, the spill cost may be computed for each of the set of values during a single pass over the computer code.

At step 1206, the simplification process is performed to simplify the interference graph. Step 1206 may include elements or features from one or more of steps 1108, 1110, 1112, or 1114. In some embodiments, this phase, together with step 1208, cooperates to find memory addresses for each of the set of values by traversing and manipulating the interference graph. This step may include repeatedly examining the values in the interference graph and removing values with one or more remaining placements in some order. As each value is removed, its interferences (edges) are also removed (increasing the neighboring values' remaining placements) and the value is pushed on the stack.

During the simplification process, if the compiler reaches a point where every value in interference graph has less than one remaining placement, a value is chosen as a spill candidate. The candidate and its interferences (edges) are removed from the graph, and the value is pushed on the stack. In some embodiments, to choose a spill candidate, the compiler may examine every value in the current interference graph, choosing the value with the lowest ratio of spill cost to impact. The rationale is based on the preference for spill values with low spill cost and high impact. When preferring high impact, the compiler chooses values to remove from the graph that will tend to free up many more values (reducing their total blocked placements). Thus, the impact of a value may be the sum of the blocked placements for all the current interferences (edges), or simply the current total blocked placements. During the simplification process, several values may get marked as spill candidates.

At step 1208, the rebuilding process is performed to rebuild the interference graph. Step 1208 may include elements or features from one or more of steps 1110 or 1116.

In some embodiments, addresses may be chosen for values in the order determined during the simplification process. Each value is popped in turn from the stack, reinserted in the interference graph, and, if possible, given a memory address so that it doesn't overlap any of its neighbors. Values that were added to the stack as spill candidates may or may not have an address available. If no address is available, the value is marked for spilling. All other values that were not selected as spill candidates are certain to receive an address. If all values are assigned addresses, then the storage allocation has succeeded. If some spill candidates are marked for spilling, the allocation continues with step 1210.

At step 1210, spill code is inserted into the computer code for each value marked for spilling (e.g., for each spilled value). In some embodiments, each value marked for spilling may be stored in a second memory different than the memory, such as the integrated circuit device's main memory. The spilled value may be copied to the second memory after its definition and brought to the memory just before it is used. In some embodiments, the spill code may be inserted during a single pass over the computer code. During the next performance of step 1202, a new interference graph may be constructed that incorporates any changes brought about by generating the spill code.

Figure 13:
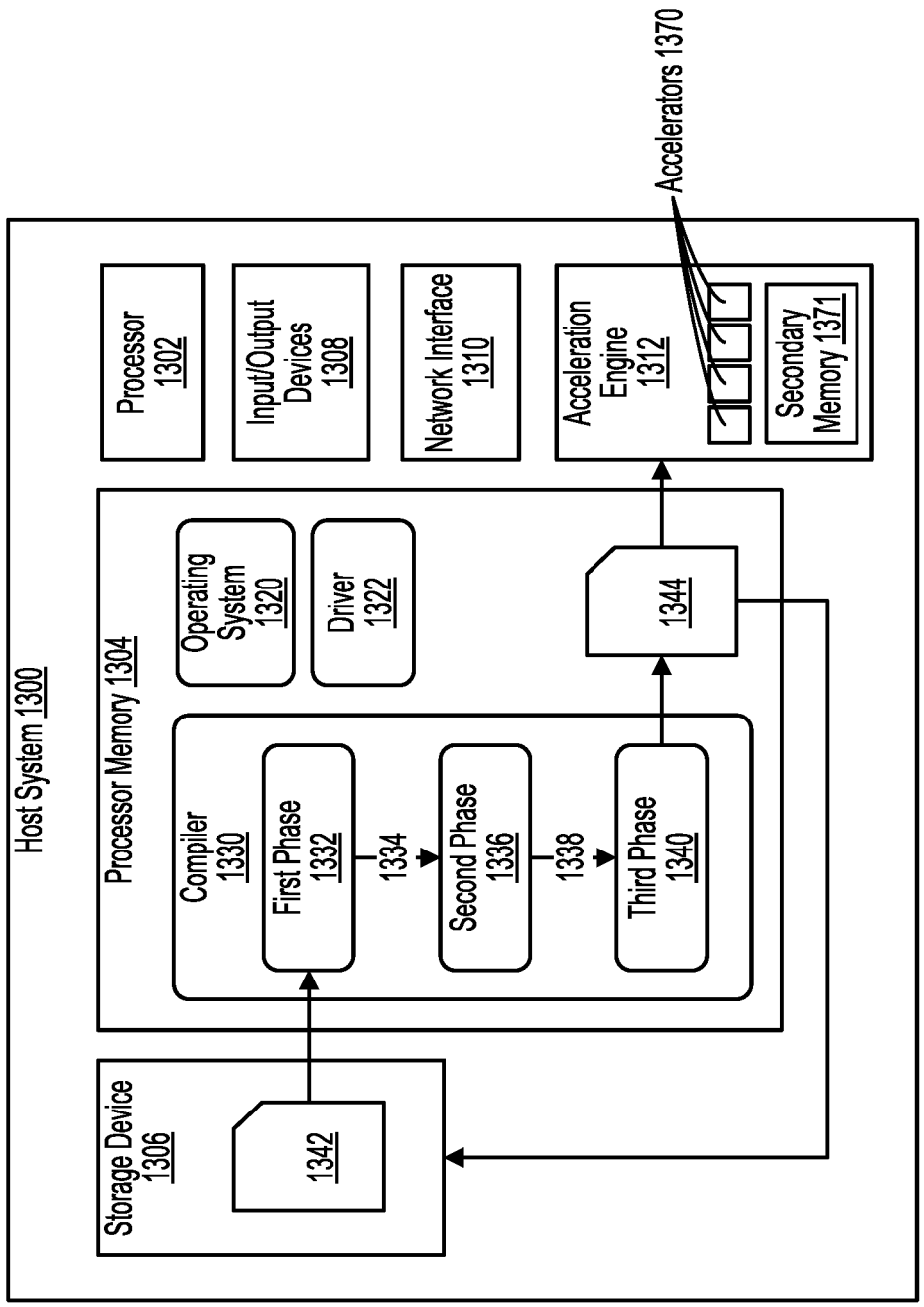
FIG. 13 illustrates an example of a host system on which a compiler can run.

FIG. 13 illustrates an example of a host system 1300 on which a compiler 1330 can run, in accordance with some embodiments. The illustrated host system 1300 is an example of a computing device, and includes a processor 1302, a processor memory 1304, at least one storage device 1306, various Input/Output (I/O) devices 1308, and at least one network interface 1310. In the example of FIG. 13, host system 1300 also includes an acceleration engine 1312, which is an integrated circuit device that can accelerate certain operations or computations performed by host system 1300. In various examples, host system 1300 can be implemented as a server in a data center, a desktop computer, a laptop computer, a tablet computer, or a smartphone, among other examples. In some examples, operations or components discussed below as performed or included in host system 1300 can be performed or included in other computer devices. For example, compiler 1330 can execute on host system 1300 while acceleration engine 1312 is located at a different host system.

Processor 1302 is an integrated circuit device that can execute program code, in the form of instructions. The program code can be used for various software applications or tools, such as an operating system 1320 or compiler 1330. While processor 1302 is executing a program, the instructions for the program can be stored in processor memory 1304. The instructions can also be stored elsewhere, such as on storage device 1306, and can be loaded into processor memory 1304 when needed by processor 1302. Processor 1302 can also use processor memory 1304 for temporary storage of other data on which processor 1302 is operating. In various examples, processor memory 1304 is a volatile memory type, such as a type of Random Access Memory, though non-volatile memory types can, alternatively or additionally, be used for processor memory 1304.

Storage device 1306 is an example of a device that can include non-volatile memory. For example, storage device 1306 can be a magnetic disk drive, a solid state drive, or an optical drive, among other examples. Storage device 1306 can further be non-transitory, such that program code and other data stored on storage device 1306 remains present when storage device 1306 is not powered on.

Storage device 1306 is one example of a peripheral device, which are components that can be coupled to host system 1300 to add functionality to host system 1300. Other examples of peripheral devices include Input/Output devices 1308 and network interface 1310. Input/Output devices 1308 can include user input and output devices, such as keyboards, mice, touch screens, microphones, display screens, speakers, printers, and scanners, among other examples. Network interface 1310, which can be implemented using a network interface card, can provide access to one or more networks. Network interface 1310 can include, for example, a physical port for connecting a network cable and/or wireless antennas for communicating with Wi-Fi and/or cellular networks. Network interface 1310 can also be described as an I/O device.

Acceleration engine 1312 is also another type of peripheral device or I/O device. Acceleration engine 1312 is a device that is purpose built to perform certain operations that can be performed by processor 1302, but can be performed faster by acceleration engine 1312. For example, acceleration engine 1312 can include one or more neural network accelerators 1370, and, as such, may be able to perform the large scale, parallel computations of a neural network more efficiently than when the computations are performed by processor 1302. As another example, acceleration engine 1312 can be a GPU, and may be optimized to perform the computations needed for graphics rendering. Other examples of devices that can be implemented by acceleration engine 1312 include cryptographic accelerators, compression and decompression accelerators, 3-D accelerators, regular expression accelerators, security accelerators, and others.

In various examples, acceleration engine 1312 can execute program code to perform certain operations. For example, when acceleration engine 1312 includes one or more neural network accelerators 1370, acceleration engine 1312 can be programmed to execute a particular neural network, such as one that performs image recognition or one that performs machine translation. As a further example, to support the execution of a neural network, acceleration engine 1312 can be programed to perform operations such as copying data for the neural network from processor memory 1304 (for example) into acceleration engine 1312, copying input data for the neural network from processor memory 1304 into acceleration engine 1312, and/or copying results from acceleration engine 1312 into processor memory 1304, among other examples.

To generate program code for acceleration engine 1312, in various examples, host system 1300 can execute compiler 1330. Compilers, in general, are software programs that translate program code written in a human-readable language into a format (e.g., machine instructions) that can be read and processed by an integrated circuit device. In the example of FIG. 13, acceleration engine 1312 includes one or more neural network accelerators 1370 and compiler 1330 is for compiling a neural network description into instructions to be executed on acceleration engine 1312. When acceleration engine 1312 implements a different type of accelerator, another compiler can be used.

Compiler 1330 can be activated, for example, when operating system 1320 receives keyboard, mouse, touchscreen, voice commands, or other inputs from Input/Output devices 1308. The inputs can further include parameters for compiler 1330, such as input code 1342 to compile and configuration options for the compilation process. Once compiler 1330 is activated, processor 1302 can load the instructions for compiler 1330 into processor memory 1304, and can execute the instructions.

In the example of FIG. 13, compiler 1330 includes a first stage 1332, a second stage 1336, and a third stage 1340, which each perform different operations to produce compiled code 1344. In other examples, compiler 1330 can combine the operations of first stage 1332, second stage 1336, and/or third stage 1340 into fewer stages, or can divide the operations of one of the stages into multiple stages.

First stage 1332 can receive and process input code 1342. Input code 1342 can describe a program in a high-level programming language, such as Java, C++, or Tensorflow, among many other examples. Input code 1342 can describe, for example, steps to perform image recognition, speech recognition, machine translation, or other operations. Input code 1342 can be obtained, for example, from storage device 1306. Alternatively, though not illustrated here, input code 1342 may be located in processor memory 1304 or can be obtained from a network location, using network interface 1310. Processing of input code 1342 can include sorting the operations described in input code 1342 into layers, where the outputs of one layer provide the inputs to a next layer. Processing can also include identifying steps to be performed by processor 1302, rather than by acceleration engine 1312. For example, processor 1302, through the execution of a driver 1322, may need to perform steps such as configuring Direct Memory Access (DMA) descriptors for moving data into or out of acceleration engine 1312, among other examples.

The output 1334 of first stage 1332 can be organized, for example, in the layers, nodes, and connections between nodes of a neural network. Second stage 1336 can perform intermediate processing on this output 1334. For example, the operations performed in any one layer, or at any one node in a layer, may be too many for acceleration engine 1312 to perform at the same time. Acceleration engine 1312 may, for example, have a limited amount of local storage space for the data needed for a computation, or the computations may be more than acceleration engine 1312 can perform at one time. In this example, first stage 1332 can break the operations of the layer or node down into smaller operations, which can fit into the acceleration engine's local memory and/or can fit into the computing capacity of acceleration engine 1312. Processing of the output 1334 of first stage 1332 can include other steps, such as scheduling, or determining the order in which acceleration engine 1312 and/or processor 1302 will perform operations, among other examples.

In various examples, output 1338 of second stage 1336 includes the various steps to be performed by components of acceleration engine 1312, in the order that the steps are to be performed. Output 1338 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 1340 can operate on output 1338 of second stage 1336, and perform various steps before producing the instructions that are to be executed by acceleration engine 1312. These steps can include, for example, removing redundant dependencies, resolving or handling dependencies between nodes by inserting synchronization instructions into the code, identifying possible optimizations in memory usage or memory bandwidth usage, and other operations.

The output of third stage 1340 is compiled code 1344, which may include machine instructions in binary format. In some examples, compiled code 1344 can be stored in processor memory 1304. Alternatively or additionally, compiled code 1344 can be copied to storage device 1306 or to a network location. As noted above, acceleration engine 1312 may be located at a different host system, in which case compiled code 1344 can be sent over network interface 1310 to the other host system.

In some embodiments, each of accelerators 1370 may include one or more low-latency (or lower-latency) memories (e.g., SRAM) for storing values that are generated during the execution of compiled code 1344 on accelerators 1370. In some embodiments, acceleration engine 1312 may further include a secondary memory 1371 that may be a high-latency (or higher-latency) memory (e.g., DRAM) for storing any of the values that are unable to be stored in the low-latency memories of accelerators 1370. In some embodiments, compiler 1330 may generate compiled code 1344 that includes memory location assignments indicating where each value that is generated during the execution of compiled code 1344 is to be stored.

In the example of FIG. 13, host system 1300 can execute a driver 1322, which can also be referred to as a device driver or runtime driver, that manages acceleration engine 1312. Driver 1322 can provide an interface between applications executing on host system 1300 (or on another host system) and acceleration engine 1312. For example, driver 1322 can provide an Application Program Interface (API) that defines functions for feeding input data to acceleration engine 1312 and defining the operation to perform on the input data. In this and other examples, driver 1322 can configure acceleration engine 1312 to perform the operation. For example, driver 1322 can identify a neural network that acceleration engine 1312 is to execute, as well as the location in processor memory 1304 or on storage device 1306 where compiled code 1344 for the neural network is located. Driver 1322 can further load into acceleration engine 1312 or cause acceleration engine 1312 to load compiled code 1344, can load or cause acceleration engine 1312 to load the input data on which the neural network is to operate, and/or can cause acceleration engine 1312 to begin executing on the input data. Once acceleration engine 1312 has finished, acceleration engine 1312 can notify driver 1322, and driver 1322 can deliver a result back to the application that requested the result.

Figure 14:
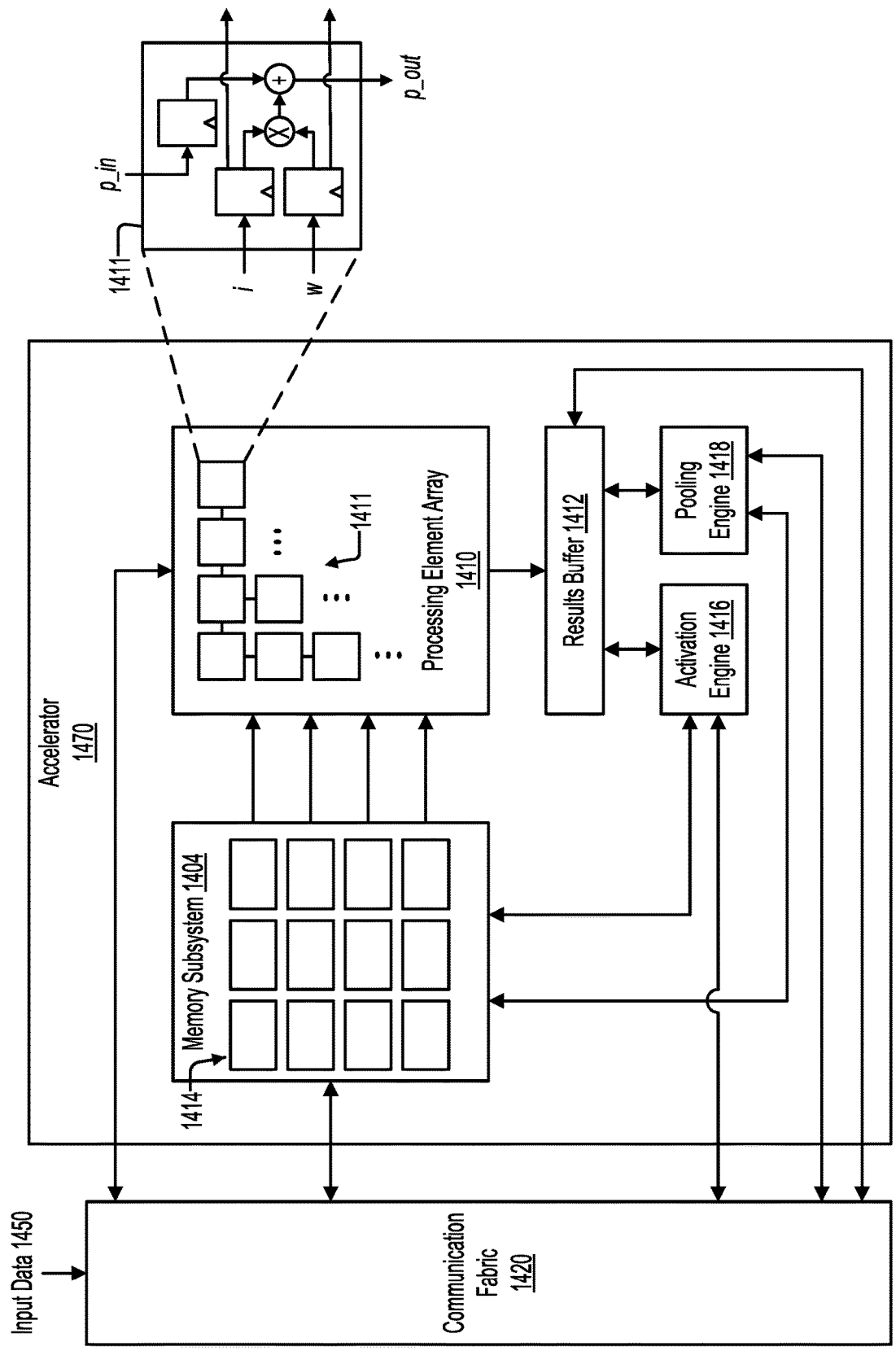
FIG. 14 illustrates an example of an integrated circuit device.

FIG. 14 illustrates an example of an integrated circuit device, in accordance with some embodiments. The example of FIG. 14 illustrates an accelerator 1470. In various examples, accelerator 1470, for a set of input data (e.g., input data 1450), can execute computations using a processing element array 1410, an activation engine 1416, and/or a pooling engine 1418. In some examples, the example accelerator 1470 may be an integrated circuit component of a processor, such as a neural network processor. The processor may have other integrated circuit components, including additional accelerator engines.

In various implementations, memory subsystem 1404 can include multiple memory banks 1414. In these implementations, each memory bank 1414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1414. For example, each memory bank can be a physically separate memory component that has an address space that is separate and independent of the address spaces of each other memory bank. In this example, each memory bank may have at least one read channel and may have at least one separate write channel that can be used at the same time. In these examples, memory subsystem 1404 can permit simultaneous access to the read or write channels of multiple memory banks. As another example, memory subsystem 1404 can include arbitration logic such that arbitration between, for example, the outputs of multiple memory banks 1414 can result in more than one memory bank's output being used. In these and other examples, though globally managed by memory subsystem 1404, each memory bank can be operated independently of any other.

Having memory banks 1414 be independently accessible can increase the efficiency of accelerator 1470. For example, values can be simultaneously read and provided to each row of processing element array 1410, so that the entire processing element array 1410 can be in use in one clock cycle. As another example, memory banks 1414 can be read at the same time that results computed by processing element array 1410 are written to memory subsystem 1404. In contrast, a single memory may be able to service only one read or write at a time. With a single memory, multiple clock cycles can be required, for example, to read input data for each row of processing element array 1410 before processing element array 1410 can be started.

In various implementations, memory subsystem 1404 can be configured to simultaneously service multiple clients, including processing element array 1410, activation engine 1416, pooling engine 1418, and any external clients that access memory subsystem 1404 over a communication fabric 1420. In some implementations, being able to service multiple clients can mean that memory subsystem 1404 has at least as many memory banks as there are clients. In some cases, each row of processing element array 1410 can count as a separate client. In some cases, each column of processing element array 1410 can output a result, such that each column can count as a separate write client. In some cases, output from processing element array 1410 can be written into memory banks 1414 that can then subsequently provide input data for processing element array 1410. As another example, activation engine 1416 and pooling engine 1418 can include multiple execution channels, each of which can be separate memory clients. Memory banks 1414 can be implemented, for example, using static random access memory (SRAM).

In various implementations, memory subsystem 1404 can include control logic. The control logic can, for example, keep track of the address spaces of each of memory banks 1414, identify memory banks 1414 to read from or write to, and/or move data between memory banks 1414. In some implementations, memory banks 1414 can be hardwired to particular clients. For example, a set of memory banks 1414 can be hardwired to provide values to the rows of processing element array 1410, with one memory bank servicing each row. As another example, a set of memory banks can be hard wired to receive values from columns of processing element array 1410, with one memory bank receiving data for each column.

Processing element array 1410 is the computation matrix of the example accelerator 1470. Processing element array 1410 can, for example, execute parallel integration, convolution, correlation, and/or matrix multiplication, among other things. Processing element array 1410 includes multiple processing engines 1411, arranged in rows and columns, such that results output by one processing engine 1411 can be input directly into another processing engine 1411. Processing engines 1411 that are not on the outside edges of processing element array 1410 thus can receive data to operate on from other processing engines 1411, rather than from memory subsystem 1404.

In various examples, processing element array 1410 uses systolic execution, in which data arrives at each processing engine 1411 from different directions at regular intervals. In some examples, input data can flow into processing element array 1410 from the left and weight values can be loaded at the top. In some examples weights and input data can flow from the left and partial sums can flow from top to bottom. In these and other examples, a multiply-and-accumulate operation moves through processing element array 1410 as a diagonal wave front, with data moving to the right and down across the array. Control signals can be input at the left at the same time as weights, and can flow across and down along with the computation.

In various implementations, the number of columns in processing element array 1410 determines the computational capacity of processing element array 1410, and the number of rows determines the required memory bandwidth for achieving maximum utilization of processing element array 1410. Processing element array 1410 can have, for example, 64 columns and 428 rows, or some other number of columns and rows.

An example of a processing engine 1411 is illustrated in FIG. 14 in an inset diagram. As illustrated by this example, a processing engine 1411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1411.

In the illustrated example, an input from above can include a partial sum, pin, provided either from another processing engine 1411 or from a previous round of computation by processing element array 1410. When starting a computation for a new set of input data, the top row of processing element array 1410 can receive a fixed value forp in, such as zero. As illustrated by this example, i and w are multiplied together and the result is summed with p in to produce a new partial sum, pout, which can be input into another processing engine 1411. Various other implementations of processing engine 1411 are possible.

Outputs from the last row in processing element array 1410 can be temporarily stored in results buffer 1412. The results can be intermediate results, which can be written to memory banks 1414 to be provided to processing element array 1410 for additional computation. Alternatively, the results can be final results, which, once written to memory banks 1414 can be read from memory subsystem 1404 over communication fabric 1420, to be output by the system.

In some implementations, accelerator 1470 includes an activation engine 1416. In these implementations, activation engine 1416 can combine the results from processing element array 1410 into one or more output activations. For example, for a convolutional neural network, convolutions from multiple channels can be summed to produce an output activation for a single channel. In other examples, accumulating results from one or more columns in processing element array 1410 may be needed to produce an output activation for a single node in the neural network. In some examples, activation engine 1416 can be bypassed.

In various examples, activation engine 1416 can include multiple separate execution channels. In these examples, the execution channels can correspond to the columns of processing element array 1410, and can perform an operation on the outputs of a column, the result of which can be stored in memory subsystem 1404. In these examples, activation engine 1416 may be able to perform between 1 and n parallel computations, where n is equal to the number of columns in processing element array 1410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 1470 can include a pooling engine 1418. Pooling is the combining of outputs of the columns of processing element array 1410. Combining can include for example, computing a maximum value, a minimum value, an average value, a median value, a summation, a multiplication, or another logical or mathematical combination. In various examples, pooling engine 1418 can include multiple execution channels that can operating on values from corresponding columns of processing element array 1410. In these examples, pooling engine 1418 may be able to perform between 1 and n parallel computations, where n is equal to the number of columns in processing element array 1410. In various examples, execution channels of pooling engine 1418 can operate in parallel and/or simultaneously. In some examples, pooling engine 1418 can be bypassed.

Herein, activation engine 1416 and pooling engine 1418 may be referred to collectively as execution engines. Processing element array 1410 is another example of an execution engine. Another example of an execution engine is a Direct Memory Access (DMA) engine, which may be located outside accelerator 1470.

Input data 1450 can arrive over communication fabric 1420. Communication fabric 1420 can connect accelerator 1470 to other components of a processor, such as a DMA engine that can obtain input data 1450 from an Input/Output (I/O) device, a storage drive, or a network interface. Input data 1450 can be, for example one-dimensional data, such as a character string or numerical sequence, or two-dimensional data, such as an array of pixel values for an image or frequency and amplitude values over time for an audio signal. In some examples, input data 1450 can be three-dimensional, as may be the case with, for example, the situational information used by a self-driving car or virtual reality data. In some implementations, memory subsystem 1404 can include a separate buffer for input data 1450. In some implementations, input data 1450 can be stored in memory banks 1414 when accelerator 1470 receives input data 1450.

In some examples, accelerator 1470 can implement a neural network processing engine. In these examples, accelerator 1470, for a set of input data 1450, can execute a neural network to perform a task for which the neural network was trained. Executing a neural network on a set of input data can be referred to as inference or performing inference.

The weights for the neural network can be stored in memory subsystem 1404, along with input data 1450 on which the neural network will operate. The neural network can also include instructions, which can program processing element array 1410 to perform various computations on the weights and the input data. The instructions can also be stored in memory subsystem 1404, in memory banks 1414 or in a separate instruction buffer. Processing element array 1410 can output intermediate results, which represent the outputs of individual layers of the neural network. In some cases, activation engine 1416 and/or pooling engine 1418 may be enabled for computations called for by certain layers of the neural network. Accelerator 1470 can store the intermediate results in memory subsystem 1404 for inputting into processing element array 1410 to compute results for the next layer of the neural network. Processing element array 1410 can further output final results from a last layer of the neural network. The final results can be stored in memory subsystem 1404 and then be copied out to host processor memory or to another location.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-program product tangibly embodied in a non-transitory machine-readable storage medium, the computer-program product including instructions configured to cause a processor to perform operations for executing a compiler, the operations comprising:
   receiving computer code to be converted into machine instructions for execution on an integrated circuit device, the integrated circuit device including a static random-access memory (SRAM) and a dynamic random-access memory (DRAM), the SRAM including a set of memory locations;
   determining, based on the computer code, a set of values that are to be stored on the integrated circuit device during the execution of the machine instructions on the integrated circuit device, wherein each of the set of values is to be stored in either the SRAM or the DRAM during the execution of the machine instructions;
   constructing an interference graph that includes the set of values and a set of interferences that indicate which of the set of values are concurrently stored during the execution of the machine instructions;
   computing a number of possible placements in the SRAM for each of the set of values;
   computing a number of blocked placements in the SRAM for each of the set of values using the interference graph;
   computing a number of remaining placements in the SRAM based on the number of possible placements and the number of blocked placements for each of the set of values;
   assigning at least a portion of the set of values to the set of memory locations of the SRAM based on the number of remaining placements for each of the set of values, resulting in a set of memory location assignments; and
   generating the machine instructions based on the computer code while incorporating the set of memory location assignments such that the machine instructions use the set of memory location assignments.

2. The computer-program product of claim 1, wherein assigning the set of values to the set of memory locations includes:
   performing a simplification process of the interference graph by repeatedly removing one of the set of values from the interference graph based on the number of remaining placements for each of the set of values, wherein the set of values are removed from the interference graph in accordance with a first order.

3. The computer-program product of claim 2, wherein assigning the set of values to the set of memory locations further includes:
   performing a rebuilding process of the interference graph by repeatedly adding one of the set of values back into the interference graph in accordance with a second order, wherein the set of values are assigned to the set of memory locations in accordance with the second order, and wherein the second order is determined based on the first order.

4. The computer-program product of claim 3, wherein each value of the set of values is assigned to the set of memory locations so as to not overlap with previously assigned values that interfere with the value, in accordance with the second order.

5. A computer-implemented method comprising:
   determining a set of values that are to be stored on an integrated circuit device based on computer code;
   constructing an interference graph that includes the set of values and a set of interferences that indicate which of the set of values are concurrently stored during execution of machine instructions on the integrated circuit device;
   computing a number of possible placements in a memory of the integrated circuit device for each of the set of values;
   computing a number of blocked placements in the memory for each of the set of values using the interference graph; and
   assigning at least a portion of the set of values to a set of memory locations in the memory based on the number of possible placements and the number of blocked placements for each of the set of values, resulting in a set of memory location assignments.

6. The computer-implemented method of claim 5, further comprising:
   generating the machine instructions based on the computer code while incorporating the set of memory location assignments.

7. The computer-implemented method of claim 5, further comprising:
   selecting a value of the set of values to be a spill candidate based on the number of possible placements and the number of blocked placements for each of the set of values.

8. The computer-implemented method of claim 7, further comprising:
   assigning the selected value to a second memory of the integrated circuit device, wherein the second memory has higher latency than the memory, wherein the set of memory location assignments includes the selected value assigned to the second memory.

9. The computer-implemented method of claim 5, further comprising:
   computing a number of remaining placements in the memory based on the number of possible placements and the number of blocked placements for each of the set of values, wherein the set of values are assigned to the set of memory locations based on the number of remaining placements for each of the set of values.

10. The computer-implemented method of claim 5, further comprising:
    receiving the computer code, wherein the computer code is an intermediate representation of source code.

11. The computer-implemented method of claim 5, wherein the memory includes a set of processor registers, a scratchpad memory, or a cache.

12. The computer-implemented method of claim 5, wherein each of the set of values is one of a scalar, a vector, a tensor, or an array.

13. A computer-program product tangibly embodied in a non-transitory machine-readable storage medium, the computer-program product including instructions configured to cause a processor to perform operations comprising:

determining a set of values that are to be stored on an integrated circuit device based on computer code;

constructing an interference graph that includes the set of values and a set of interferences that indicate which of the set of values are concurrently stored during execution of machine instructions on the integrated circuit device;

computing a number of possible placements in a memory of the integrated circuit device for each of the set of values;

computing a number of blocked placements in the memory for each of the set of values using the interference graph; and assigning at least a portion of the set of values to a set of memory locations in the memory based on the number of possible placements and the number of blocked placements for each of the set of values, resulting in a set of memory location assignments.

14. The computer-program product of claim 13, wherein the operations further comprise:

generating the machine instructions based on the computer code while incorporating the set of memory location assignments.

15. The computer-program product of claim 13, wherein the operations further comprise:

selecting a value of the set of values to be a spill candidate based on the number of possible placements and the number of blocked placements for each of the set of values.

16. The computer-program product of claim 15, wherein the operations further comprise:

assigning the selected value to a second memory of the integrated circuit device, wherein the second memory has higher latency than the memory, wherein the set of memory location assignments includes the selected value assigned to the second memory.

17. The computer-program product of claim 13, wherein the operations further comprise:

computing a number of remaining placements in the memory based on the number of possible placements and the number of blocked placements for each of the set of values, wherein the set of values are assigned to the set of memory locations based on the number of remaining placements for each of the set of values.

18. The computer-program product of claim 13, wherein the operations further comprise:

receiving the computer code, wherein the computer code is an intermediate representation of source code.

19. The computer-program product of claim 13, wherein the memory includes a set of processor registers, a scratchpad memory, or a cache.

20. The computer-program product of claim 13, wherein each of the set of values is one of a scalar, a vector, a tensor, or an array.

* * * * *